(12) United States Patent
Omara et al.

(10) Patent No.: US 8,997,101 B2
(45) Date of Patent: Mar. 31, 2015

(54) SCALABLE THREAD LOCKING WITH CUSTOMIZABLE SPINNING

(71) Applicant: Microsoft Corporation, Redmond, WA (US)

(72) Inventors: Emad A. Omara, Bellevue, WA (US); John J. Duffy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 14/196,398

(22) Filed: Mar. 4, 2014

(65) Prior Publication Data

US 2014/0189699 A1   Jul. 3, 2014

Related U.S. Application Data

(62) Division of application No. 12/625,344, filed on Nov. 24, 2009, now Pat. No. 8,683,470.

(51) Int. Cl.
*G06F 9/46* (2006.01)
*G06F 9/48* (2006.01)
*G06F 9/52* (2006.01)

(52) U.S. Cl.
CPC .............. *G06F 9/4843* (2013.01); *G06F 9/526* (2013.01)
USPC ........................................................ 718/102

(58) Field of Classification Search
None
See application file for complete search history.

(56) References Cited

U.S. PATENT DOCUMENTS

| 6,003,101 | A | * | 12/1999 | Williams | ...................... 710/112 |
|---|---|---|---|---|---|
| 6,601,120 | B1 | | 7/2003 | Schimmel | |
| 6,779,090 | B2 | | 8/2004 | McKenney et al. | |
| 6,965,961 | B1 | | 11/2005 | Scott | |
| 7,594,234 | B1 | | 9/2009 | Dice | |
| 2005/0080963 | A1 | | 4/2005 | Schopp | |
| 2005/0081204 | A1 | * | 4/2005 | Schopp | .......................... 718/100 |
| 2005/0283783 | A1 | * | 12/2005 | DeSota | .......................... 718/100 |
| 2009/0328053 | A1 | | 12/2009 | Dice | |
| 2011/0126204 | A1 | | 5/2011 | Omara | |

OTHER PUBLICATIONS

Scott, et al.—Scalable Queue-Based Spin Locks with Timeout—Published Date: Jun. 18-20, 2001 http://www.cs.rice.edu/~wns1/papers/2001-PPoPP-QBLTO.pdf (Copy Attached).

(Continued)

*Primary Examiner* — Emerson Puente
*Assistant Examiner* — Sisley Kim
(74) *Attorney, Agent, or Firm* — Kevin Sullivan; Raghu Chinagudabha; Micky Minhas

(57) ABSTRACT

Embodiments described herein are directed to dynamically controlling the number of spins for a selected processing thread among a plurality of processing threads. A computer system tracks both the number of waiting processing threads and each thread's turn, wherein a selected thread's turn comprises the total number of waiting processing threads after the selected thread's arrival at the processor. Next, the computer system determines, based on the selected thread's turn, the number of spins that are to occur before the selected thread checks for an available thread lock. The computer system also, based on the selected thread's turn, changes the number of spins, such that the number of spins for the selected thread is a function of the number of waiting processing threads and processors in the computer system.

20 Claims, 4 Drawing Sheets

(56) References Cited

OTHER PUBLICATIONS

Cakarevic, et al.—Understanding the Overhead of the Spin-Lock Loop in CMT Architectures—Published Date: 1991 http://www.ideal.ece.ufl.edu/workshops/wiosca08/paper2.pdf (Copy Attached).

Mellor-Crummey, et al.—Synchronization without Contention—Published Date: 1991 http://www.cs.rochestereduk-scott/papers/1991_ASPLOS_sync.pdf (Copy Attached).

Mellor-Crummey, et al.—Scalable Reader-Writer Synchronization for Shared-Memory Multiprocessors—Published Date: 1991 http://www.cs.rochester.edu/www/u/scott/papers/1991_PPoPP_read_write.pdf (Copy Attached).

Author Unknown—How to: Use SpinWait and SpinLock—Retrieved Date: Oct. 15, 2009 http://msdn.microsoft.com/en-us/library/dd460716(VS.100).aspx (Copy Attached).

Office Action cited in U.S. Appl. No. 12/625,344 mailed Jan. 5, 2012.
Office Action cited in U.S. Appl. No. 12/625,344 mailed Jul. 2, 2012.
Notice of Allowance cited in U.S. Appl. No. 12/625,344 mailed Nov. 6, 2013.

* cited by examiner

SCALABLE THREAD LOCKING WITH CUSTOMIZABLE SPINNING

CROSS-REFERENCE TO RELATED APPLICATIONS

This divisional application claims priority to and the benefit of U.S. patent application Ser. No. 12/625,344, entitled "Scalable Thread Locking with Customizable Spinning", which was filed on Nov. 24, 2009, and which is incorporated by reference in its entirety herein.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. In some systems, such as parallel processing systems, multiple threads are used to process various portions of a software application. Processing threads can be assigned to a particular task such as application input/output (I/O) and can be reassigned as needed. At times, a thread (such as one assigned to I/O) may be left in a waiting state, where the thread is waiting for an input before it can process the next instruction. In such cases, the thread is said to be "spinning" or waiting in a loop. In such a state, the thread is typically designed to repeatedly check for the necessary input. If the thread does not receive the input for a certain amount of time, the thread "blocks" or goes to sleep.

BRIEF SUMMARY

Embodiments described herein are directed to dynamically controlling the number of spins for a selected processing thread among a plurality of processing threads. A computer system tracks both the number of waiting processing threads and each thread's turn, wherein a selected thread's turn comprises the total number of waiting processing threads after the selected thread's arrival at the processor. Next, the computer system determines, based the selected thread's turn, the number of spins that are to occur before the selected thread checks for an available thread lock. The computer system also, based on the selected thread's turn, changes the number of spins, such that the number of spins for the selected thread is a function of the number of waiting processing threads and processors in the computer system.

In another embodiment, a computer system initializes a single integer variable configured to keep track of the following: the status of a lock bit indicating whether a lock has been acquired or not, a number of waiting threads, and the status of a thread tracking flag. Next, the computer system checks the lock bit to determine whether the lock is available for a selected processing thread. The computer system also, upon determining that the lock is available, assigns the lock to the selected processing thread.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
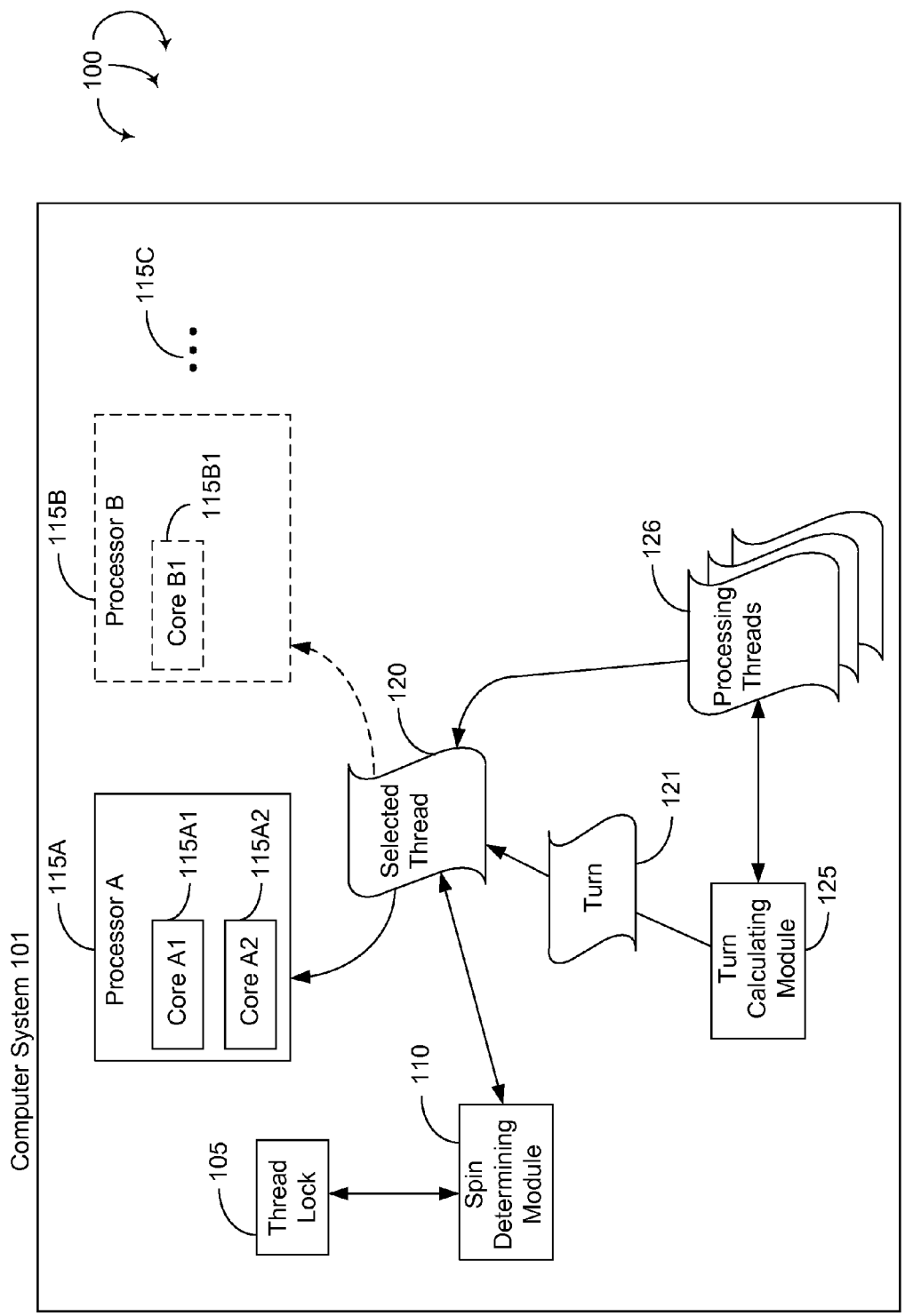
FIG. 1 illustrates a computer architecture in which embodiments of the present invention may operate including dynamically controlling the number of spins for a selected processing thread among a plurality of processing threads.

Embodiments described herein are directed to dynamically controlling the number of spins for a selected processing thread among a plurality of processing threads. A computer system tracks both the number of waiting processing threads and each thread's turn, wherein a selected thread's turn comprises the total number of waiting processing threads after the selected thread's arrival at the processor. Next, the computer system determines, based on the selected thread's turn, the number of spins that are to occur before the selected thread checks for an available thread lock. The computer system also, based on the selected thread's turn, changes the number of spins, such that the number of spins for the selected thread is a function of the number of waiting processing threads and processors in the computer system.

In another embodiment, a computer system initializes a single integer variable configured to keep track of the following: the status of a lock bit indicating whether a lock has been acquired or not, a number of waiting threads, and the status of a thread tracking flag. Next, the computer system checks the lock bit to determine whether the lock is available for a selected processing thread. The computer system also, upon determining that the lock is available, assigns the lock to the selected processing thread.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101 (also "system 101" or "computer 101" herein). Computer system 101 may include any type of system configured to perform some type of computation based on a set of inputs. Computer system 101 may include any number of processors. As illustrated in FIG. 1, computer system 101 includes processor A (115A) with two cores, core A1 (115A1) and core A2 (115A2). System 101 may or may not include additional processor 115B, or further additional processors 115C. While processor B is shown with one processing core (core B1 (115B1)), it should be noted that any of the processors in system 101 may have any number of processing cores.

Computer system 101's processors may be configured to keep track of the number of waiting processing threads 126. For example, when processing a software application or other software routine, some processing threads may be in a waiting state. The threads may be waiting for an input that must be received before the thread can continue processing. Additionally or alternatively, a thread may be waiting for a task to be assigned to it. Turn calculating module 125 may be used to calculate a thread's turn. As used herein, the term "turn" refers to the total number of waiting processing threads after a selected thread's arrival at a processor. Thus, for instance, if selected thread 120 was selected for processing, its turn would be the total number of waiting processing threads 126 in computer system 101 after the selected thread's arrival at the processor (e.g. processor A (115A)).

This turn calculation 121 may be used by spin determining module 110 to determine the number of spins that are to occur before the selected thread checks for an available thread lock 105. As explained above, it is advantageous in some situations for a thread to not be completely released from a task while waiting for an input, but rather to "spin" while waiting for the input. In this spin state, the processing thread is ready to immediately continue processing upon receiving or acquiring a thread lock. The processing thread remains in the spin state, periodically checking to see whether the corresponding thread lock is available. Once the thread lock is available and acquired, the processing thread ceases to spin and resumes processing.

Accordingly, the thread's calculated turn 121 may be used to variably and dynamically determine how many times the thread should spin before checking to see whether thread lock 105 has become available. Thus, the number of spins for the selected thread may be a function of the number of waiting processing threads and processors in the computer system. This helps to ensure that threads arriving later at a processor spin more and check the lock less, leading to more efficient processing thread management.

Figure 2:
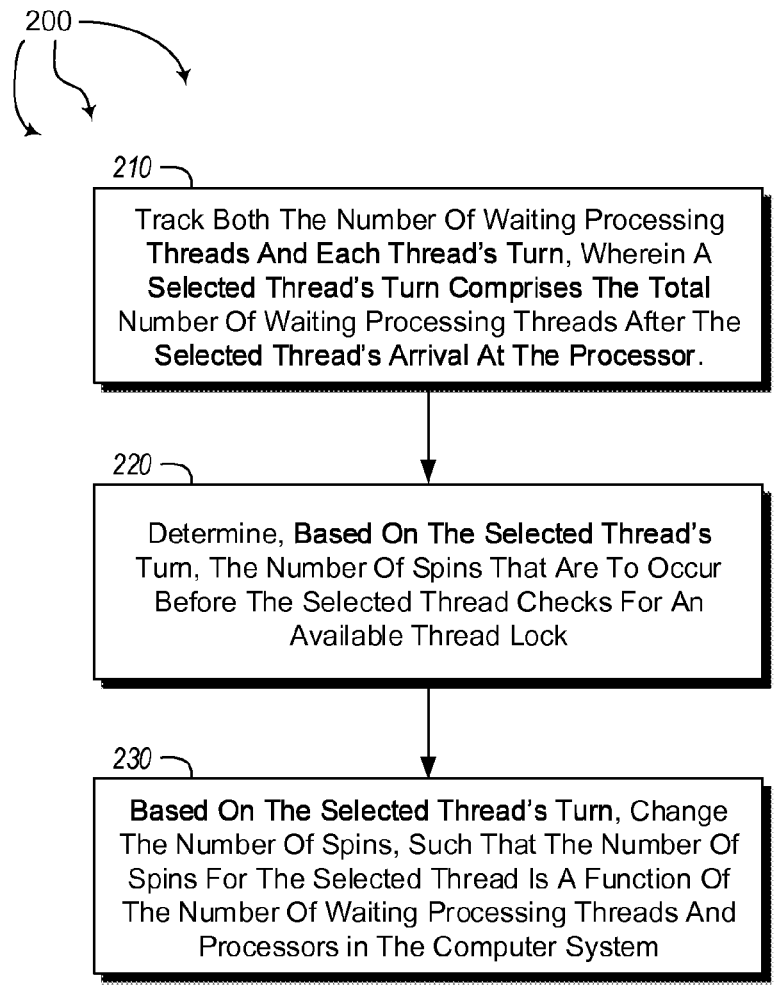
FIG. 2 illustrates a flowchart of an example method for dynamically controlling the number of spins for a selected processing thread among a plurality of processing threads.

FIG. 2 illustrates a flowchart of a method 200 for dynamically controlling the number of spins for a selected processing thread among a plurality of processing threads. The method 200 will now be described with frequent reference to the components and data of environment 100.

Method 200 includes an act of tracking both the number of waiting processing threads and each thread's turn, wherein a selected thread's turn comprises the total number of waiting processing threads after the selected thread's arrival at the processor (act 210). For example, processor A (115A) may track both the number of waiting processing threads 126 as well as each thread's turn (121), where the thread's turn includes the total number of waiting processing threads after selected thread 120's arrival at processor A. In some embodiments, a single integer variable may be used to keep track of the waiting processing threads.

Figure 4A:
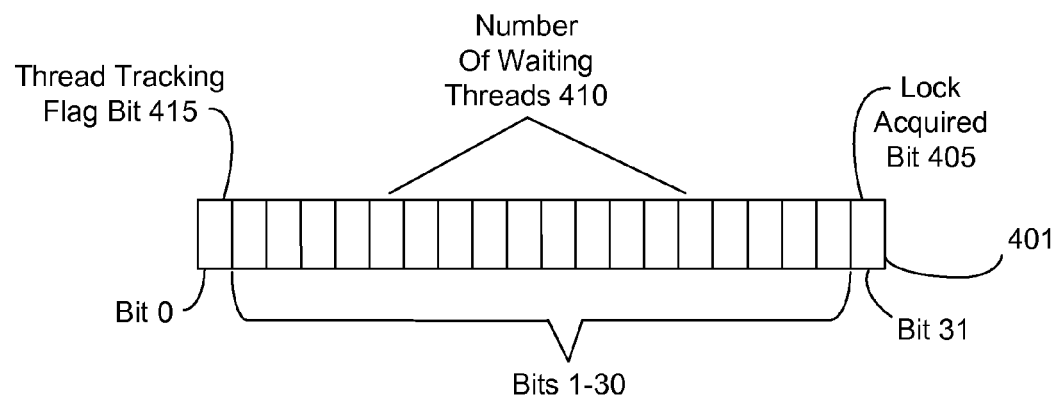
FIGS. 4A and 4B illustrate elements including variable bits and thread yielding phrases, respectively.

The single integer variable may be configured to maintain each of the following portions of information: whether the thread lock has been acquired or not, the number of waiting processing threads and a thread tracking flag. As illustrated in FIG. 4A, the single integer variable 401 may be 32 bits long. In one embodiment, bit 0 is used as a thread tracking flag bit 415. This bit is typically only set during debugging. When the bit is set, it indicates that the waiting number bits are to be used to hold the current thread holder ID. Thus, a thread tracking mode may be enabled where the current thread holder ID is maintained instead of the number of waiting processing threads. Bits 1-30 indicate the number of waiting threads 410 (e.g. processing threads 126). Bit 31 comprises a lock acquired bit 405 that indicates whether a thread lock (e.g. 105) has been acquired or not by a selected thread.

Method 200 includes an act of determining, based on the selected thread's turn, the number of spins that are to occur before the selected thread checks for an available thread lock (act 220). For example, spin determining module 110 may determine, based on selected thread 120's turn 121, the number of spins that are to occur before the selected thread checks for thread lock 105. As explained above, the number of spins may be dynamic and variable. The number of spins for a given thread may differ depending on the thread's turn. Additionally, the number of spins may also be dependent on, or be affected by, the number of processors (or the number of available processors) in the computer system.

In some cases, a user may specify a timeout period indicating when the selected thread is to cease waiting for an available thread lock. This user-specified time period may be used in addition to the number of spins calculated based on the selected thread's turn or it may be used as an alternative to calculating the number of spins for the thread.

Method 200 includes, based on the selected thread's turn, an act of changing the number of spins, such that the number of spins for the selected thread is a function of the number of waiting processing threads and processors in the computer system (act 230). For example, computer system 101 may change the number of spins for selected thread 120 based on the selected thread's turn 121. Thus, the number of spins for the selected thread may be a function of the number of waiting processing threads and processors in the computer system.

In some cases, if the selected thread's turn is greater than the number of processors in the computer system, the thread yields directly and does not spin. In other words, because the number of processors or processor cores is lower than the number of waiting processing threads, the thread cannot afford to spin and yields, or allows another waiting thread to begin processing. Thus, spinning is optimized for maximum thread processing efficiency. The variable spin may be calculated and applied to each processing thread in the system. These calculations and applications may be performed automatically and dynamically as each thread is called to perform processing.

Figure 3:
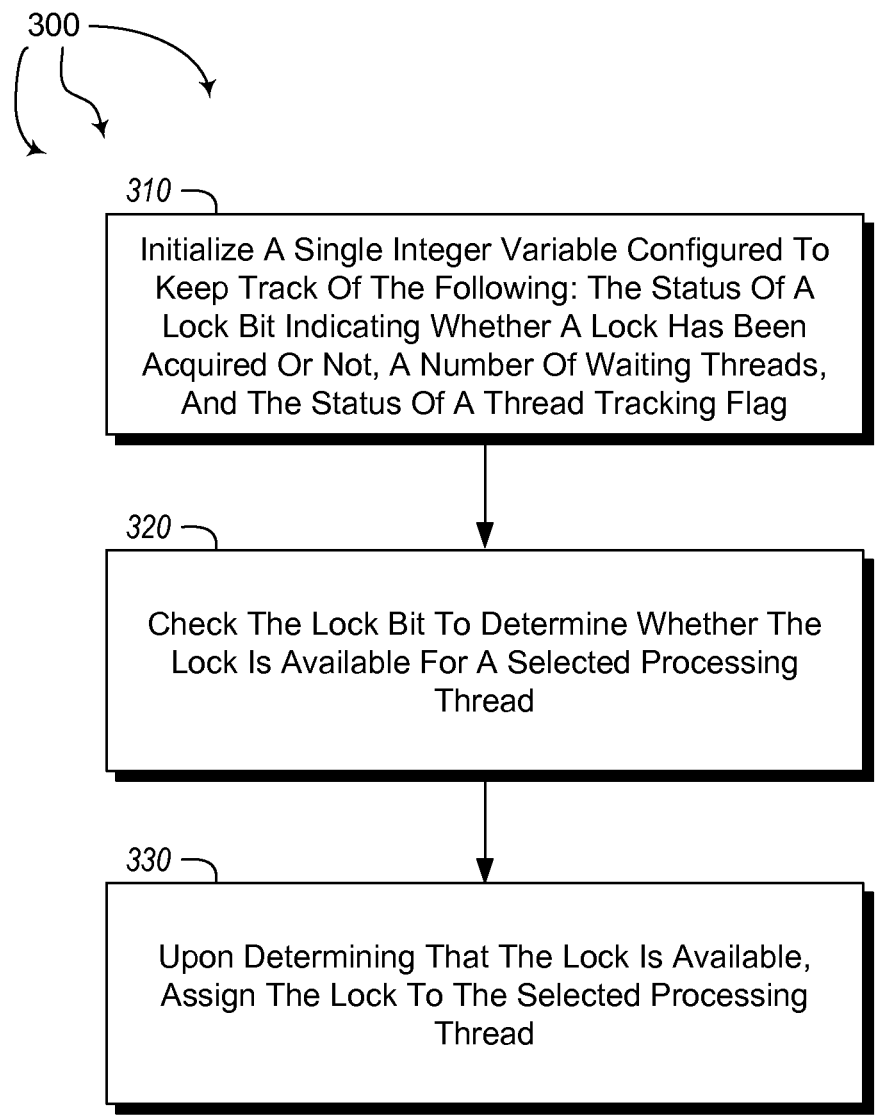
FIG. 3 illustrates a flowchart of an example method for implementing a method for implementing a customized spin for a selected processing thread based on the thread's turn.

FIG. 3 illustrates a flowchart of a method 300 for implementing a customized spin for a selected processing thread based on the thread's turn. The method 300 will now be described with frequent reference to the components and data of environment 100.

Method 300 includes an act of initializing a single integer variable configured to keep track of the following: the status of a lock bit indicating whether a lock has been acquired or not, a number of waiting threads, and the status of a thread tracking flag (act 310). For example, computer system 101 may initialize single integer variable 401 which is configured to keep track of the following: the status of a lock bit (e.g. bit 405) indicating whether a lock has been acquired or not, a number of waiting threads (e.g. bits 410), and the status of a thread tracking flag (bit 415). As explained above, the thread tracking flag bit is typically only set during debugging. When the bit is set, it indicates that the waiting number bits are to be used to hold the current thread holder ID. Thus, a thread tracking mode may be enabled where the current thread holder ID is maintained instead of the number of waiting processing threads. Bits 1-30 (410) indicate the number of waiting processing threads and bit 405 comprises a lock acquired bit that indicates whether a thread lock (e.g. 105) has been acquired or not by a selected thread.

Method 300 includes an act of checking the lock bit to determine whether the lock is available for a selected processing thread (act 320). For example, selected thread 120 may check lock bit 405 to determine whether thread lock 105 is available. If the thread lock is not available, the thread spins, as is described further below. If the thread lock is available, the process continues with act 330.

Method 300 includes, upon determining that the lock is available, an act of assigning the lock to the selected processing thread (act 330). For example, computer system 101, upon determining that thread lock 105 is available, may assign the thread lock to selected processing thread 120. Upon acquiring the thread lock, the selected thread can stop spinning and resume processing the input it was processing before the thread began spinning.

In cases where the thread lock 105 is unavailable, one of the multiple processing threads 126 may increment the selected thread's waiting count. In some embodiments, the selected thread's waiting count is incremented by two. In other cases, the selected thread's waiting count may be incremented by some other number including one or three and higher. Upon incrementing the selected thread's waiting count, the computer system 101 may calculate the selected thread's turn by dividing the thread's updated waiting count by two. If it is determined that the updated waiting count divided by two is less than the number of processors, the computer system may spin the selected processing thread based on the selected thread's turn. In some embodiments, the selected processing thread 120 may be configured to spin until a predefined number of spinning iterations have been completed. Upon finishing the predefined number of spinning iterations without acquiring the lock, the selected processing thread may begin yielding.

Alternatively, if it is determined that the updated waiting count divided by two is more than the number of processors, the computer system may forego any spinning and direct the selected thread to begin yielding. In this case, because there are more waiting threads than processors (or processing cores), it is more efficient to reassign the thread than allow it to spin. Yielding will be described in greater detail below with regard to FIG. 4B.

Figure 4B:
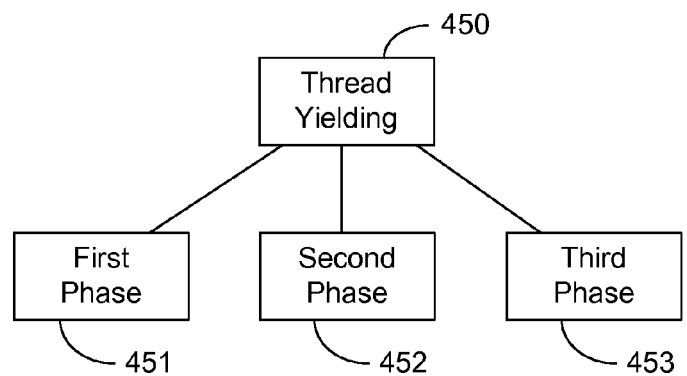

As described in FIG. 4B, thread yielding 450 may comprise three phases: a first phase 451, a second phase 452 and a third phase 453. The first yielding phase may include causing the selected processing thread 120 to give any remaining processing time in its time slice to a higher priority, ready thread in the current processor (e.g. processor A). If there are no higher priority ready threads, the selected processing thread continues executing until it finishes its full time slice.

The second yielding phase may include causing the selected processing thread 120 to give any remaining processing time in its time slice to a higher priority, ready thread in any of the system's processors (or processing cores). If there are no higher priority ready threads, the selected processing thread continues executing until it finishes its full time slice.

The third yielding phase may include putting the selected processing thread in a sleep state for a variable, customizable amount of time. Thus, in the third yielding phase, the thread is not just put at the end of a processing queue, but is actually put in a sleep state for some amount of time. This amount of time may be variable and customizable by a computer system user.

Accordingly, a computer system may dynamically control the number of spins for a selected processing thread among a plurality of processing threads. The number of spins may be based on the selected thread's turn which indicates the total number of waiting threads after the selected thread's arrival at the processor. The variable number of spins ensures that, for any given computer processing system, the processing threads are spinning the optimal number of times and, in cases where it is not advisable to spin, the threads yield to higher priority threads. The yielding, as described above, can be done in stages to ensure the most efficient process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer program product comprising the following: one or more computer-readable hardware storage devices having stored thereon computer-executable instructions that, when executed by one or more processors of the computing system, cause the computing system to perform a method for implementing a customized spin for a selected processing thread based on the thread's turn, the method comprising:

an act of initializing a single integer variable configured to keep track of the following: the status of a lock bit indicating whether a lock has been acquired or not, a number of waiting threads, and the status of a thread tracking flag;

an act of checking the lock bit to determine whether the lock is available for a the selected processing thread;

upon determining that the lock is available, an act of assigning the lock to the selected processing thread; and upon determining that the lock is unavailable, an act of one of said number of waiting threads incrementing the selected thread's waiting count by two.

2. The computer program product of claim 1, further comprising an act of calculating the selected thread's turn, wherein the turn is calculated by dividing the updated waiting count by two.

3. The computer program product of claim 2, wherein upon determining that the updated waiting count divided by two is less than the number of processors, an act of spinning the selected processing thread based on the selected thread's turn.

4. The computer program product of claim 2, wherein upon determining that the updated waiting count divided by two is more than the number of processors, an act of foregoing any spinning and directing the selected thread to begin yielding.

5. The computer program product of claim 3, wherein the selected processing thread spins until a predefined number of spinning iterations have been completed.

6. The computer program product of claim 5, wherein, upon finishing the predefined number of spinning iterations without acquiring the lock, the selected processing thread begins yielding.

7. The computer program product of claim 6, wherein the yielding comprises a first phase that includes placing the selected processing thread at the end of a scheduling queue for a current processor and placing another, higher priority thread at the top of the scheduling queue for the current processor.

8. The computer program product of claim 6, wherein the yielding comprises a second phase that includes placing the selected processing thread at the end of a scheduling queue for each of the processors in the computer system and placing another, higher priority thread at the top of the scheduling queue for the processors of the computer system.

9. The computer program product of claim 8, wherein the yielding comprises a third phase that includes putting the selected processing thread in a sleep state for a variable, customizable amount of time.

10. A computer system comprising the following:
one or more processors;
system memory;
one or more computer-readable storage media having stored thereon computer-executable instructions that, when executed by the one or more processors, causes the computing system to perform a method for implementing a customized spin for a selected processing thread based on the thread's turn, the method comprising the following:

an act of initializing a single integer variable configured to keep track of the following: the status of a lock bit indicating whether a lock has been acquired or not, a number of waiting threads, and the status of a thread tracking flag;

an act of checking the lock bit to determine whether the lock is available for the selected processing thread;

upon determining that the lock is available, an act of assigning the lock to the selected processing thread; and upon determining that the lock is unavailable, an act of one of said number of waiting threads incrementing the selected thread's waiting count by at least two.

11. The computer system claim 10, wherein the selected thread's waiting count is incremented by three.

12. The computer system of claim 11, further comprising an act of calculating the selected thread's turn, wherein the turn is calculated by dividing the updated waiting count by two.

13. The computer system of claim 12, wherein upon determining that the updated waiting count divided by two is less than the number of processors, an act of spinning the selected processing thread based on the selected thread's turn.

14. The computer system of claim 12, wherein upon determining that the updated waiting count divided by two is more than the number of processors, an act of foregoing any spinning and directing the selected thread to begin yielding.

15. A method comprising the following:
  implementing a customized spin for a selected processing thread based on the thread's turn at a computer system including at least one processor and system memory, wherein implementing the customized spin is performed by:
    an act of initializing a single integer variable configured to keep track of the following: the status of a lock bit indicating whether a lock has been acquired or not, a number of waiting threads, and the status of a thread tracking flag;
    an act of checking the lock bit to determine whether the lock is available for the selected processing thread;
    upon determining that the lock is available, an act of assigning the lock to the selected processing thread; and
    upon determining that the lock is unavailable, an act of one of said number of waiting threads incrementing the selected thread's waiting count by at least two.

16. The computer-implemented method of claim 15, wherein the selected processing thread spins until a predefined number of spinning iterations have been completed.

17. The computer-implemented method of claim 16, wherein, upon finishing the predefined number of spinning iterations without acquiring the lock, the selected processing thread begins yielding.

18. The computer-implemented method of claim 17, wherein the yielding comprises a first phase that includes placing the selected processing thread at the end of a scheduling queue for a current processor and placing another, higher priority thread at the top of the scheduling queue for the current processor, and wherein the yielding comprises a second phase that includes placing the selected processing thread at the end of a scheduling queue for each of the processors in the computer system and placing another, higher priority thread at the top of the scheduling queue for the processors of the computer system.

19. The computer-implemented method of claim 15, wherein the selected thread's waiting count is incremented by three.

20. The computer-implemented method of claim 19, wherein the computer system comprises a number of processors, and wherein the method further comprises determining if the incremented waiting count divided by two is more than the number of processors in the computer system, the selected thread yields directly and does not spin.

* * * * *